(12) United States Patent
Dubé et al.

(10) Patent No.: US 7,206,831 B1
(45) Date of Patent: Apr. 17, 2007

(54) ON CARD PROGRAMMABLE FILTERING AND SEARCHING FOR CAPTURED NETWORK DATA

(75) Inventors: Jean-François Dubé, Santa Clara, CA (US); Thomas A. Myers, San Jose, CA (US); Douglas Durham, Sunnyvale, CA (US); Andrew J. Milne, Sierra Madre, CA (US); Roumel R. Garcia, Vallejo, CA (US); A. Michael Lawson, Morgan Hill, CA (US)

(73) Assignee: Finisar Corporation, Sunnyvale, CA (US)

( * ) Notice: Subject to any disclaimer, the term of this patent is extended or adjusted under 35 U.S.C. 154(b) by 877 days.

(21) Appl. No.: 10/228,212

(22) Filed: Aug. 26, 2002

(51) Int. Cl.
*G06F 15/16* (2006.01)

(52) U.S. Cl. .................. 709/223; 224/230; 712/228; 370/254

(58) Field of Classification Search ................ 709/224, 709/230; 712/228; 370/254
See application file for complete search history.

(56) References Cited

U.S. PATENT DOCUMENTS

| | | | | |
|---|---|---|---|---|
| 5,566,170 A * | 10/1996 | Bakke et al. | ............... | 370/392 |
| 5,598,410 A * | 1/1997 | Stone | ......................... | 370/469 |
| 5,732,246 A * | 3/1998 | Gould et al. | .................. | 716/16 |
| 5,850,386 A | 12/1998 | Anderson et al. | ........... | 370/241 |
| 5,916,305 A * | 6/1999 | Sikdar et al. | ................ | 709/236 |
| 6,055,493 A | 4/2000 | Ries et al. | .................. | 702/186 |
| 6,122,757 A | 9/2000 | Kelley | .......................... | 714/39 |
| 6,134,647 A * | 10/2000 | Acton et al. | ................... | 712/28 |
| 6,266,789 B1 | 7/2001 | Bucher et al. | ................ | 714/39 |
| 6,304,903 B1 * | 10/2001 | Ward | ......................... | 709/224 |
| 6,393,587 B2 | 5/2002 | Bucher et al. | ................ | 714/39 |
| 6,442,670 B2 * | 8/2002 | Acton et al. | ................... | 712/28 |
| 6,880,070 B2 | 4/2005 | Gentieu et al. | | |
| 6,892,237 B1 * | 5/2005 | Gai et al. | .................... | 709/224 |
| 7,043,535 B2 * | 5/2006 | Chi et al. | .................... | 709/218 |
| 2001/0030990 A1 * | 10/2001 | Rouphael et al. | ........... | 375/142 |
| 2001/0052056 A1 * | 12/2001 | Acton et al. | ................ | 711/147 |
| 2003/0081145 A1 * | 5/2003 | Seaman et al. | ............. | 348/460 |

* cited by examiner

*Primary Examiner*—David Wiley
*Assistant Examiner*—Alina Boutah
(74) *Attorney, Agent, or Firm*—Workman Nydegger

(57) ABSTRACT

A programmable data filtering/searching system for use with a data network. The primary programmable hardware-based filtering and searching portions of the system are integrated onto the same printed circuit board as the data storage device to facilitate efficient filtering and searching of data from a data stream coming from a memory storage device after being captured. In addition, the actual hardware and software used to perform the filtering and searching routines is programmable such that various filter and search criteria can be entered and utilized. The data filtering/searching system also uses metadata in addition to the captured data to minimize the time required to perform certain processes on the data from the data stream.

12 Claims, 3 Drawing Sheets

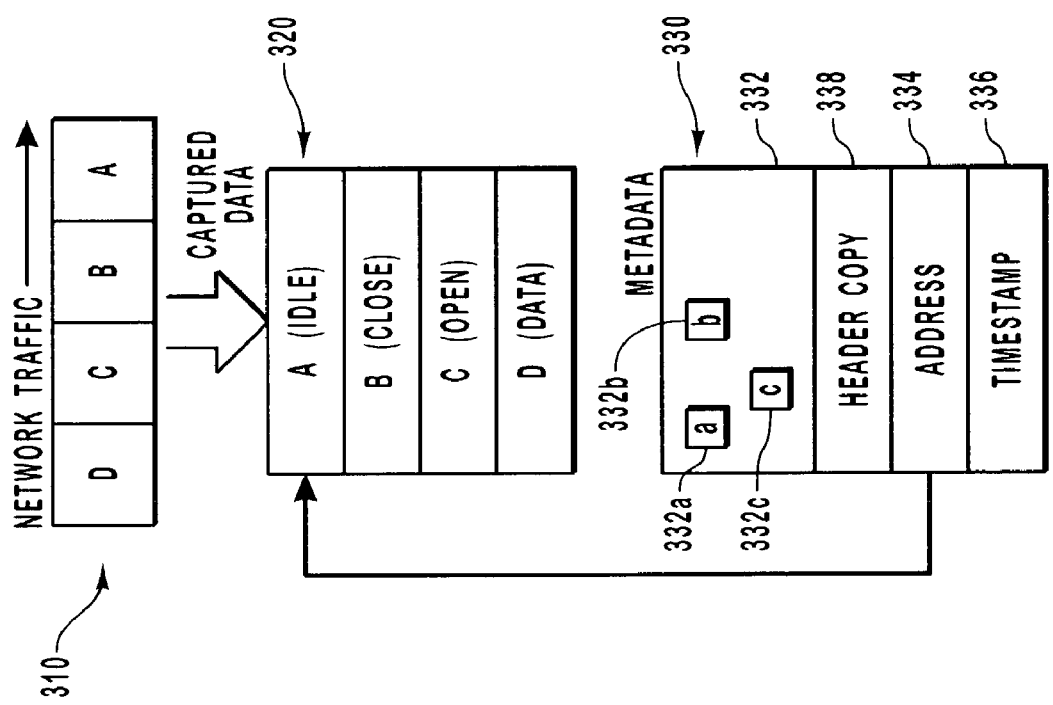

ON CARD PROGRAMMABLE FILTERING AND SEARCHING FOR CAPTURED NETWORK DATA

BACKGROUND OF THE INVENTION

1. The Field of the Invention

This invention relates generally to the field of filtering and searching routines for use in a computer network. In particular, embodiments of the present invention relate to an integrated programmable filtering and searching system for captured network data traffic.

2. The Relevant Technology

Data networks have become very common systems for efficiently transferring data and sharing resources among computer devices. By utilizing a data network, a hundred computers can have access to a large volume of data that cannot fit into the storage devices on any one of the individual computers. In addition, the various computers within the network can exchange data with one another to efficiently capitalize on other network resources such as output devices, human interface devices, high speed internet connections, communication devices, etc. Therefore, data networks are extremely important in maximizing resources among multiple computers.

Data networks generally operate by sending data throughout the network, with individual data packets or frames containing a destination address identifying the device that is to receive the data. Individual devices on the network are capable of identifying the data packets that are addressed to them. In order to effectively monitor the operation and efficiency of the various devices within a data network and the network communication between them, there have been developed various network analyzers that capture a portion of the network traffic, analyze the captured network traffic, and identify problems associated with the traffic.

Generally, monitoring devices such as this perform various filtering and searching routines to speed up the process of analyzing the data. Existing filtering/searching systems are generally either hardware or software based. The hardware based systems usually have some form of digital circuitry that performs the filtering and searching routines before the data is passed on to a processor. The existing hardware based systems are undesirable because of their inability to efficiently adapt to different filtering and searching criteria that may be necessary, since these existing hardware systems utilize permanent digital circuitry. The software based systems rely entirely on some form of processor to filter, search and then analyze all of the data. The main disadvantage of the software based systems is that they are relatively slow and it is necessary to utilize a large amount of processing resources to go through the captured data buffer. In addition, software based systems generally require that the data from the data buffer be transferred between multiple locations before it can finally be filtered, searched and processed within a computer processor. Furthermore, analytical instruments operate on the captured network traffic, which is often hard to analyze quickly because it must be decoded every time a search or filtering operation is applied to a volume of captured data.

Data networks have become increasingly faster with the advent of optical data transfer, in which a large amount of data is carried on individual optical fibers. A single port associated with a network analyzer can generate a capture of several hundred megabytes of data. Multi-port analyzers generate gigabytes of captured data. Indeed, it has been common to experience software-based processing and analysis times in the range of one-half hour for each volume of captured data, which limits the usability of such network analyzers.

Other attempts have been made to perform filtering of data using hardware devices other than a host CPU. However, these filtering processes fail to adequately enhance the efficiency of the filtering and searching of network data, since these filtering processes using hardware cannot be programmed as CPUs can be programmed, and are also applied directly to the captured data.

In general, it is desirable for a data searching and filtering system to be versatile with regards to the types of data and protocol that can be processed. As explained above, there is a need for an efficient integrated programmable data searching and filtering system that is capable of processing data within a network. In addition, the data searching and filtering system should be able to manage the flow of any of a number of types of data and protocols.

BRIEF SUMMARY OF THE INVENTION

These and other problems in the prior art are addressed by embodiments of the present invention, which relates to a programmable data filtering/searching system for use with protocol analyzers for data networks. The primary programmable hardware-based filtering and searching portions of the system are integrated onto the same printed circuit board as the data storage device to facilitate efficient filtering and searching of data from a data stream coming from a memory storage device after being captured. The hardware and software used to perform the filtering and searching routines are programmable, such that various filter and search criteria can be entered and utilized. The data filtering/searching system also uses metadata in addition to standard captured data to minimize the time required to search and analyze the data from the data buffer. Performing programmable hardware-based filtering and searching on the same printed circuit board as the capture buffers that store the captured network data enable captured network data from high-speed networks, such as optical data networks, to be filtered and searched faster and at hardware speeds, whereas similar analysis using conventional techniques require much longer processing.

According to one aspect of the invention, the integrated programmable data filtering/searching system generally includes capture hardware, a pair of data buffers, a filter/search engine, and a host CPU. These components are used to perform three layers of filtering and searching of the data from the network data stream. The capture hardware is a device that receives the network data traffic and creates two sets of data to be stored in the data buffers. The first type of data is referred to as captured data and is simply a copy or a representation of the actual network data put in a particular format. The second type of data is referred to as metadata, and is a shortened or summarized version of the actual data. The capture hardware summarizes the captured data and notes the presence of specific events and encapsulates this information into the metadata. The captured data is transferred into a capture buffer which is one of the two data buffers. The metadata is transferred into an event buffer which is the other of the two data buffers. This generation of the metadata is the analysis performed by the system.

The second stage of data filtering and searching is performed by the filter/search engine. The filter/search engine is a programmable hardware device, which can be programmed to filter and search the data and metadata based on selected criteria. The filter/search engine is a digital device further including a memory control logic and a micro-controller. The memory control logic facilitates transferring the data and metadata to the micro-controller for processing. The host CPU informs the micro-controller as to what criteria should be used for the second step of the filtering and searching. The micro-controller filters and searches the data and metadata according to the specified criteria from the host CPU. Whenever possible, the micro-controller relies solely on the metadata to determine which portions of the actual data are to be selected for further processing. If the micro-controller selects a portion of the metadata for processing rather than actual data, a pointer within the metadata indicates the location of the actual data within the capture buffer which should be processed. The selected data is then also transferred to the host CPU for the next stage of filtering and searching.

The host CPU receives the addresses of the selected data from the filter/search engine and then gets the data from the capture and event data buffers. The host CPU must obtain both the metadata and data from the buffers because the host CPU performs a software based filtering and searching routine using both types of data. The software within the host CPU is programmed to perform certain functions on the data to further filter and search for selected data. This additional software based filtering and searching is also programmable by simply manipulating the filter and search criteria within the software. The host CPU produces the final data, which can be used to display information to a user about the captured data that was searched and filtered. This final data could also be used to record, tabulate and display information about particular events that take place within the data stream. In addition, the final data can be fed to a network traffic expert analysis system.

The filtering and searching system of the invention provides significant advantages compared to conventional systems. According to the invention, much of the filtering and searching is performed on the same card that captures the data from the network. Performing such filtering and searching on this card significantly reduces the amount of data that is transferred to the memory of the host CPU. Reducing this data transfer accelerates the filtering and searching of the data and can increase the number of cards that can be used with a single CPU, thereby reducing the cost of protocol analyzers constructed according to the invention and increasing the amount of data that can be analyzed. Furthermore, moving processing intensive search and filtering operations outside of the host CPU allows that CPU to host more cards and handle more captured data effectively.

Unlike existing hardware devices for performing searching and filtering operations on captured network data, the methods and systems of the invention can apply some or all of the searching and filtering operations to metadata as opposed to the actual data that is captured. The metadata is information about that captured data that is created during the initial capture process. The metadata summarizes relevant characteristics and content of the captured data and is formatted to be easily and efficiently searched and filtered. The metadata isolates the searching and filtering algorithms from the complexities of the analyzed network data or protocol and avoids the need to perform complex decoding of the captured data during the searching and filtering process. Moreover, the micro-controller on the card is programmable so as to be adaptable to different types of data and different filtering and searching algorithms, providing an additional degree of usefulness not available in conventional devices. In general, the methods of searching and filtering network data according to the invention are more efficient and adaptable than conventional techniques and can significantly reduce the volume of data that is transmitted from the card to the host CPU.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 illustrates a segment of network traffic and corresponding segments of captured data and metadata.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to a programmable data filtering/searching system for use with protocol analyzers for data networks. The primary programmable hardware-based filtering and searching portions of the system are integrated onto the same printed circuit board as the data storage device to facilitate efficient filtering and searching of data from a data stream coming from a memory storage device after being captured. In addition, the programmable hardware and software used to perform the filtering and searching routines are programmable such that various filter and search criteria can be entered and utilized. The hardware-based filtering and searching portions are implemented in a programmable processor that executes program code. Thus, the hardware disclosed herein according to the invention is embodied in programmable processors that perform the searching and filtering operations of the invention.

The data filtering/searching system also uses metadata, in addition to the actual network data, to minimize the time required to perform certain processes on the data. The metadata is data that is descriptive of, summarizes, or is otherwise related to the captured network data. The data streams that are processed and analyzed as described herein are obtained using the captured network data that is stored in capture buffer and the metadata stored in an event buffer. Also, while embodiments of the present invention are described in the context of protocol analyzers that filter and search data from a captured computer network data stream, it will be appreciated that the teachings of the present invention are applicable to other applications as well.

Figure 1:
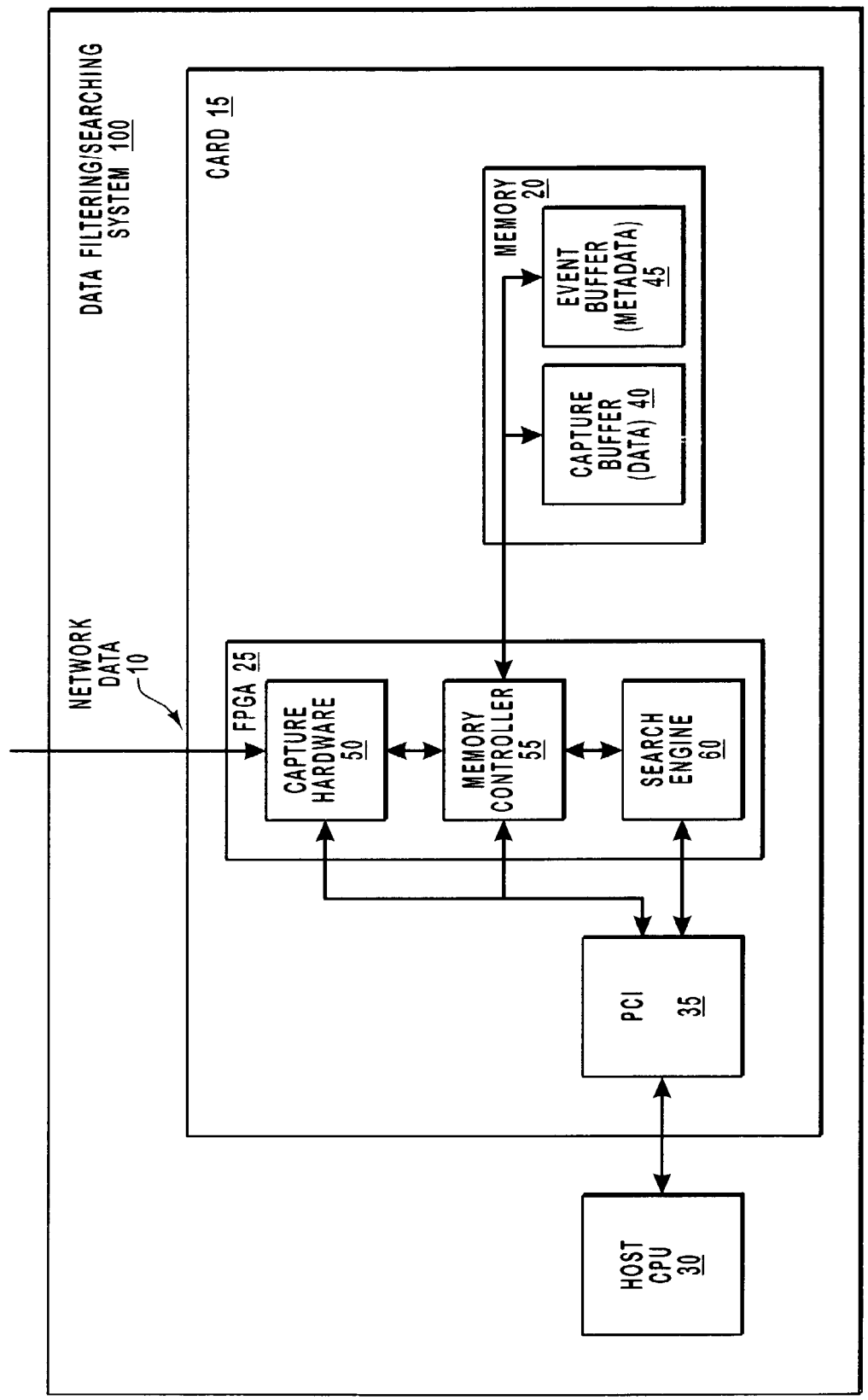
FIG. 1 illustrates a simplified schematic representation of a presently preferred embodiment of the integrated data filtering/searching system of the present invention.
Figure 2:
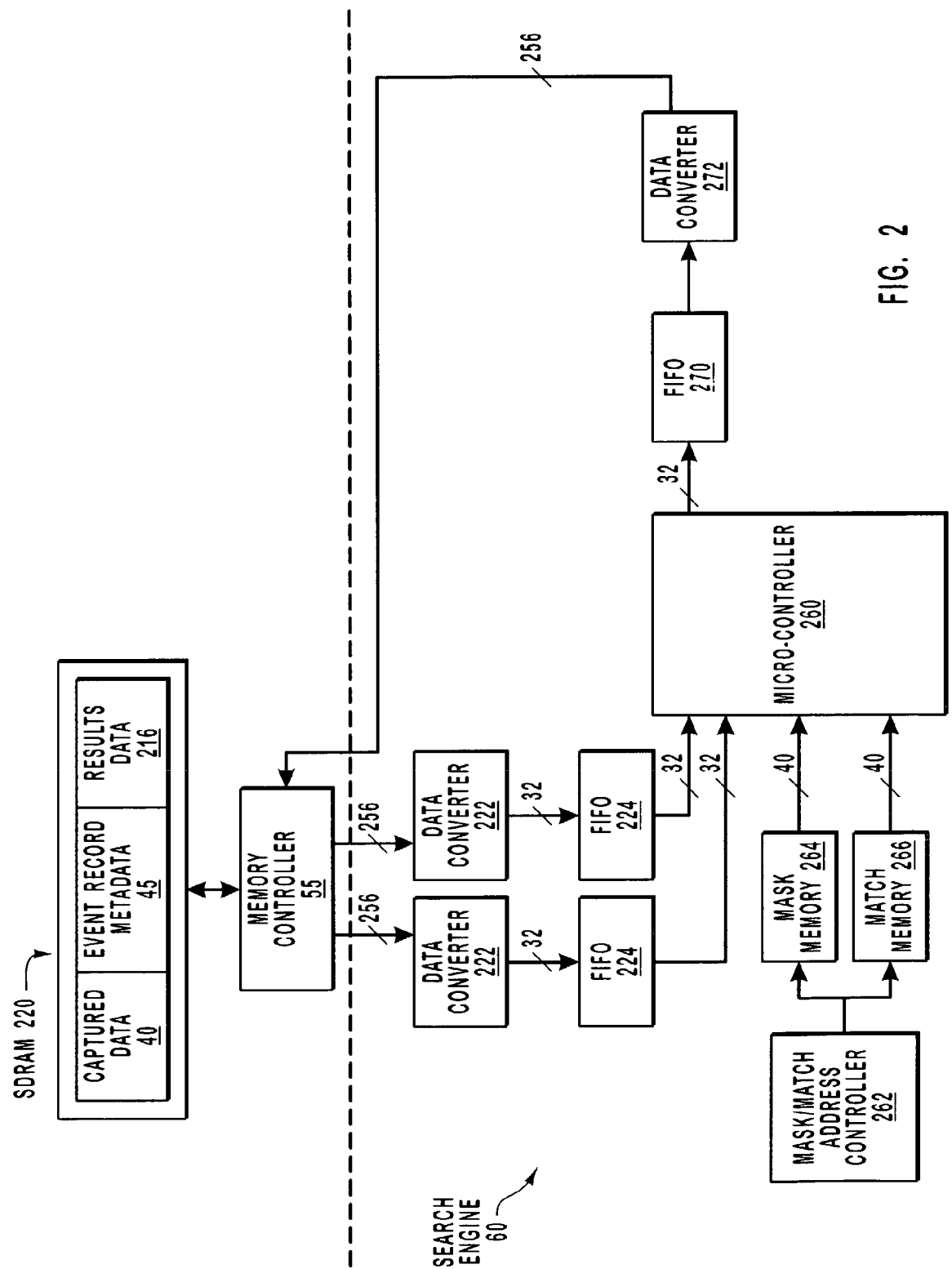
FIG. 2 illustrates a schematic detailed representation of selected components of the system of FIG. 1, with additional detail showing the various interfaces between the components.

FIG. 1 illustrates a simplified schematic representation of a presently preferred embodiment of the integrated data filtering/searching system of the present invention, designated generally at 100. FIG. 2 illustrates a more detailed schematic representation of one embodiment of the search engine 60 of FIG. 1, with additional detail showing the various interfaces between the components. As illustrated in FIG. 1, the data filtering/searching system 100 further includes a card 15 and a host CPU 30, which, in this illustrated embodiment, represent portions of a protocol analyzer. The first two stages of the filtering and searching are performed by programmable hardware components located on the card 15 while the third stage of the filtering and searching is performed by a software component residing on the host CPU 30. This multi-stage filtering and searching process maximizes the efficiency of the data filtering/searching system 100, because much of the filtering and searching is performed on the card that captures the network data and is performed before the network data is transferred to the memory of the host CPU 30, which can significantly reduce the volume of data that needs to be transferred to the memory of the host CPU. The illustrated data filtering/searching system 100 also maximizes manufacturing resources by incorporating many of the components of the system onto a single printed circuit board card 15 which can directly interface with a computer.

The card 15 further includes a memory 20, a Peripheral Component Interconnect (PCI) chip 35 and a field programmable gate array (FPGA) 25. The FPGA 25 is a programmable digital device that contains the first two filtering and searching modules of the data filtering/searching system 100. In other words, the devices located on the FPGA 25 are not permanently programmed but instead can be reprogrammed to perform different techniques of filtering and searching. The FPGA 25 further includes a capture hardware 50, a memory controller 55 and a search engine 60. The capture hardware 50 is the initial stage of filtering and searching in the data filtering/searching system. It receives the streamed network data 10 and generates two forms of data to be stored. The first type of data is referred to as captured data because it is a representation of the streamed network data 10. The other type of data is referred to as metadata because it is a summarized version of the captured data. The capture hardware 50 summarizes the events and information that are contained within a segment of the captured data and generates a complementary set of event data. The metadata also includes information about particular events that take place in the complementary captured data. The metadata and captured data will be described in more detail with reference to FIG. 3.

The memory 20 digitally stores information such that it can later be recalled in its original form. The memory 20 is configured to receive data segments from the capture hardware 50. Since the capture hardware 50 is located on the FPGA 25 and the memory 20 is not, an interface is created between the FPGA 25 and the memory 20. The memory 20 further includes a capture buffer 40 and an event buffer 45. The capture buffer 40 stores the captured data from the capture hardware 50 and the event buffer stores the metadata from the capture hardware 50. These buffers can be any form of digital storage devices such as RAM, DRAM, SDRAM, etc. The capture and event buffers 40, 45 are also connected to the memory controller 55 (located within the FPGA) and the host CPU 30 (through the memory controller 55). These connections will also require individual interfaces so as to allow for the transfer of data.

The second stage of filtering and searching is performed by the search engine 60 and the memory controller 55. The memory controller 55 receives both captured data and metadata from the memory 20 and provides this information to the search engine 60. The memory controller 55 further includes various devices for maximizing the rate at which data and information can be transferred to the search engine 60 without overfilling or underfilling the micro-controller that operates as part of search engine 60. These devices include first-in first-out (FIFO) buffers and the like. These buffering techniques can be used to maximize the efficient transfer of captured data, and metadata to the micro-controller of the search engine 60. One example of processes for transferring the data from memory to the micro-controller of the search engine is described in U.S. patent application Ser. No. 10/161,470, filed May 30, 2002, entitled "Integrated FIFO Memory Management Control System," which is incorporated herein by reference.

The micro-controller of the search engine 60 is described and illustrated in reference to FIG. 2. The micro-controller 260 is a high speed programmable analysis device that is designed to process data streams. One device that is suitable for use as micro-controller 260 is a Pico Engine developed by Finisar Corporation of Sunnyvale, Calif. Further details concerning the specific hardware construction and operation of the Pico Engine may be obtained from U.S. Pat. No. 6,880,070 entitled "Synchronous Network Traffic Processor," issued on Apr. 12, 2005, which is incorporated herein by reference.

Memory controller 55 operates with data converters 222 and first-in first-out (FIFO) buffers 224 to transfer portions of the metadata in event records buffer 45 of SDRAM 220 to micro-controller 260 so that the portions of the metadata can be searched and filtered. SDRAM 220 of FIG. 2 represents one example of memory 20 illustrated in FIG. 1. The micro-controller 260 receives mask and match information that pertains to the manner in which the micro-controller should perform the filtering and searching from the host CPU through the PCI 35. This mask and match information is transferred from PCI 35 to the micro-controller 260 using a mask/match address controller 262 and an associated mask memory 264 and match memory 266 as illustrated in FIG. 2.

The micro-controller 260 then uses the mask and match information received from the mask memory 264 and the match memory 266 to filter and search the data. The manner in which the micro-controller uses the mask and match data depends on the searching and filtering algorithms and instructions used. The mask and match may be loaded only once at the beginning of a search or streamed multiple times for each event record or section of captured data streamed into the search engine 60. It should also be noted that the search engine 60 can be used for filtering in, filtering out, searching, statistics gathering or other forms of analysis depending on its programming. It can also be reprogrammed or even programmed for multiple functions at once. Further details concerning the manner in which a Pico Engine, which can operate as micro-controller 260, uses mask and match information to perform filtering and searching operations are included in U.S. patent application Ser. No. 09/976,756, which has been incorporated herein by reference.

Whenever possible, the search engine 60 of FIG. 1 utilizes metadata rather than captured data because of its compressed size. Therefore, the search engine 60 and the associated micro-controller 260 maximize the speed of the filtering and searching processes by attempting to use the smaller and easier to analyze metadata version of the captured data for all necessary operations. As illustrated in FIG. 2, upon completion of filtering and searching, the micro-controller 260 selects particular segments of data for further analysis. The selected data includes both metadata and captured data. The resulting addresses of the selected data are transferred to a result FIFO buffer 270. The result FIFO buffer 270 and data converter 272 use FIFO techniques to efficiently transfer the selected addresses to the results data buffer 216 of SDRAM 220, which the host CPU 30 can then access for further processing. Because less than the full volume of data is transferred to the memory of host CPU 30 for further processing, the host CPU 30 can be used with multiple cards 15, thereby increasing the scale by which filtering and searching and associated protocol analysis operations can be performed.

The host CPU 30 performs the third stage of filtering and searching for the data filtering/searching system 100. After receiving the addresses of the selected data from the micro-controller 260, the host CPU 30 requests that the selected data be transferred from the memory 20. The metadata and corresponding captured data pertaining to the selected addresses given by the micro-controller 260 are transferred from both the captured buffer 40 and the event buffer 45. If a particular address is selected, both the metadata and the captured data for that address are transferred from the memory to the host CPU. The metadata contains the address of the associated captured data, therefore transferring the metadata address is sufficient to enable the host CPU 30 to obtain the address of the associated captured data. The host CPU 30 further includes a programmable software program that is configured to perform the third stage of filtering and searching for the data filtering/searching system 100. To maximize efficiency, the software program attempts to utilize metadata whenever possible to perform the filtering and searching processes on the data. After the filtering and searching processes are complete, the host CPU is able to output data obtained from the searching and filtering operations.

Reference is next made to FIG. 3, which conceptually illustrates a section of data traffic and the associated capture data and metadata. The data traffic 310 represents a sequence or segment of unaffected network data that would commonly be traveling through a network. In this example, data traffic 310 includes data A, B, C, and D, which can be, for instance, ordered sets, data fields, or other portions of data packets that are transmitted over the network. The captured data 320 is a copy of the segment of network traffic 310 and is stored in the capture buffer as described above in reference to FIG. 2. During the capture process, the micro-controller processes the data and generates metadata 330, which summarizes or identifies relevant characteristics or content of the captured data 320. Metadata 330 has a format that is compatible with the filtering and searching algorithms so that the filtering and searching algorithms can be executed more efficiently. In addition, the metadata isolates the filtering and searching algorithms from the complexities of the decoding process and the particularities and exceptions of the protocol, thereby further increasing the rate at which filtering and searching can be performed.

As shown in FIG. 3, metadata 330, which is stored in the event buffer of FIG. 2, includes field 332 that includes data specifying the relevant characteristics or content of the associated captured data or, in other words, specifies certain relevant events that are associated with the captured data. The content of field 332 is specific to the network data or protocol that is to be analyzed. In the example of FIG. 3, field 332 includes data 332a that specifies an event "a" associated with data A, data 332b that specifies an event "b" associated with data B, and data 332c that specifies an event "c" associated with data C. In this specific example, data A represents an idle field of a data packet, data B represents a close field of a data packet, and data C represents an open field of a data packet. In this manner, the filtering and searching algorithms can process the data in field 332 of the metadata, which is formatted specifically to be used with the algorithms. It is noted that data D represents data, or the payload, of a data packet, which is not referenced in the metadata.

In addition to field 332, metadata 330 includes address 334 of the corresponding captured data, as explained above in reference to FIG. 2. Metadata 330 also includes a timestamp 336 that specifies the time at which captured data 320 was obtained. In addition, metadata 338 can include a header copy field 338 in which copies of headers of data packets in captured data 320 can be stored. A copy of a header stored in metadata 330 can further enhance the efficiency of the filtering and searching algorithms in those instances in which the contents of a header are to be processed, and avoids the need of referring directly to the captured data 320.

After the captured data has been processed and analyzed as described herein, the results of the analysis can be displayed or otherwise used as desired. The host CPU produces the final data, which can be used, for example, to display information to a user about the captured data. This final data can also be used to record, tabulate and display information about particular events that take place within the data stream. In addition, the final data can be fed to a network traffic expert analysis system, one example of which is the SANMetrics system of Finisar Corporation of Sunnyvale, Calif. Regardless of the manner in which the results of the analysis are displayed or used, the on-card filtering and searching methods of the invention enable significantly more efficient analysis of captured network data and enable the analysis to be performed faster and on greater amounts of data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A filtering and searching device comprising:
    a printed circuit board comprising:
        a digital storage device; and
        a field programmable gate array further including:
            capture hardware configured to receive network data and generate segments of captured data and metadata, wherein the captured data is a representation of the network data and the metadata is a summarized version of the captured data, wherein the capture hardware transfers the captured data and metadata to the digital storage device;
            memory control logic configured to transfer the stored captured data and metadata from the digital storage device to a micro-controller; and
            said micro-controller, being programmed to select particular segments of the captured data and the metadata according to a predetermined set of criteria; and a host CPU configured to perform further filtering and searching on the selected segments utilizing a software program.

2. The filtering and searching device of claim 1, wherein the micro-controller further transfers an address corresponding to each selected segment of captured data and metadata to the host CPU.

3. The filtering and searching device of claim 1, wherein the printed circuit board is a card that is configured to be inserted into a card receptacle associated with the host CPU.

4. The filtering and searching device of claim 1, wherein the digital storage device further includes:
a capture buffer used to store the captured data; and
an event buffer used to store the metadata.

5. The filtering and searching device of claim 1, wherein the metadata includes a pointer to the address of the corresponding captured data.

6. The filtering and searching device of claim 1, wherein the capture hardware is a programmable device that can be reprogrammed to generate different types of metadata and can be reprogrammed to accept different types of network data.

7. The filtering and searching device of claim 1, wherein the memory control logic further includes buffering devices to prevent the overfilling and underfilling of the micro-controller.

8. The filtering and searching device of claim 1, wherein the printed circuit board further includes a PCI interface.

9. The filtering and searching device of claim 8, wherein the PCI interface receives a set of mask and match information from the host CPU and transfers the set of mask and match information to the micro-controller, which can use it to generate the predetermined criteria upon which the micro-controller selects segments of captured data and metadata.

10. The filtering and searching device of claim 1, wherein the host CPU obtains the selected captured data and metadata from the digital storage device.

11. The filtering and searching device of claim 1, further comprising one or more other printed circuit boards, each including a separate instance of:
said digital storage device; and
said field programmable gate array that includes a separate instance of:
said capture hardware;
said memory control logic; and
said micro-controller.

12. The filtering and searching device of claim 1, wherein less than all of the network data that was received by the capture hardware is transferred to the host CPU's main memory for further filtering, searching and analysis.

* * * * *